United States Patent
Ullmann et al.

(10) Patent No.: US 10,739,936 B2
(45) Date of Patent: *Aug. 11, 2020

(54) ZERO PARALLAX DRAWING WITHIN A THREE DIMENSIONAL DISPLAY

(71) Applicant: zSpace, Inc., Sunnyvale, CA (US)

(72) Inventors: Peter F. Ullmann, San Jose, CA (US); Clifford S. Champion, San Diego, CA (US)

(73) Assignee: zSpace, Inc., Sunnyvale, CA (US)

( * ) Notice: Subject to any disclaimer, the term of this patent is extended or adjusted under 35 U.S.C. 154(b) by 239 days.

This patent is subject to a terminal disclaimer.

(21) Appl. No.: 16/003,165

(22) Filed: Jun. 8, 2018

(65) Prior Publication Data
US 2018/0292971 A1    Oct. 11, 2018

Related U.S. Application Data

(63) Continuation of application No. 14/257,623, filed on Apr. 21, 2014, now Pat. No. 10,019,130.
(Continued)

(51) Int. Cl.
| | | |
|---|---|---|
| *G06F 3/00* | (2006.01) | |
| *G06F 3/0481* | (2013.01) | |
| *G06F 3/0484* | (2013.01) | |
| *H04N 13/128* | (2018.01) | |
| *H04N 13/366* | (2018.01) | |
| *H04N 13/398* | (2018.01) | |
| *G06T 19/20* | (2011.01) | |
| *G06F 3/0488* | (2013.01) | |

(Continued)

(52) U.S. Cl.
CPC ........ *G06F 3/04815* (2013.01); *G06F 3/0488* (2013.01); *G06F 3/04842* (2013.01); *G06F 3/04845* (2013.01); *G06T 19/20* (2013.01); *H04N 13/128* (2018.05); *H04N 13/366* (2018.05); *H04N 13/398* (2018.05); *G06T 2219/2016* (2013.01); *H04N 13/305* (2018.05);
(Continued)

(58) Field of Classification Search
CPC ............. G06F 3/04815; G06F 3/04842; G06F 3/04845; G06F 3/0488
See application file for complete search history.

(56) References Cited

U.S. PATENT DOCUMENTS

| | | |
|---|---|---|
| 7,508,384 B2 | 3/2009 | Zhang |
| 8,018,579 B1 | 9/2011 | Krah |

(Continued)

*Primary Examiner* — Kieu D Vu
*Assistant Examiner* — Andrew Chung
(74) *Attorney, Agent, or Firm* — Kowert Hood Munyon Rankin & Goetzel P.C.

(57) ABSTRACT

Systems and methods for digitally drawing on virtual 3D object surfaces using a 3D display system. A 3D drawing mode may be enabled and a display screen of the system may correspond to a zero parallax plane of a 3D scene that may present a plurality of surfaces at non-zero parallax planes. User input may be received at a location on the display screen, and in response, a surface may be specified, rendered, and displayed at the zero parallax plane. Further, additional user input on the display screen may be received specifying drawing motion across the rendered and displayed surface. The drawing motion may start at the location and continue across a boundary between the surface and another contiguous surface. Accordingly, in response to the drawing motion crossing the boundary, the contiguous surface may be rendered and displayed at the zero parallax plane along with results of the drawing motion.

20 Claims, 9 Drawing Sheets

Related U.S. Application Data

(60) Provisional application No. 61/814,315, filed on Apr. 21, 2013.

(51) Int. Cl.
  *H04N 13/305* (2018.01)
  *H04N 13/334* (2018.01)
  *H04N 13/337* (2018.01)
  *H04N 13/341* (2018.01)

(52) U.S. Cl.
  CPC ......... *H04N 13/334* (2018.05); *H04N 13/337* (2018.05); *H04N 13/341* (2018.05)

(56) References Cited

U.S. PATENT DOCUMENTS

| | | |
|---|---|---|
| 8,427,434 B1 | 4/2013 | Merolla |
| 8,553,935 B2 | 10/2013 | Mandella |
| 2005/0219240 A1 | 10/2005 | Vesely |
| 2005/0264558 A1 | 12/2005 | Vesely |
| 2007/0070066 A1 | 3/2007 | Bakhash |
| 2010/0073360 A1 | 3/2010 | Huang |
| 2011/0069019 A1 | 3/2011 | Carpendale |
| 2011/0107270 A1 | 5/2011 | Wang |
| 2012/0005624 A1 | 1/2012 | Vesely |
| 2012/0013613 A1 | 1/2012 | Vesely |
| 2012/0036433 A1 | 2/2012 | Zimmer |
| 2012/0162198 A1 | 6/2012 | Nakanishi |
| 2012/0162384 A1 | 6/2012 | Vesely |
| 2012/0206419 A1 | 8/2012 | Lee |
| 2012/0306849 A1 | 12/2012 | Steen |
| 2013/0117717 A1 | 5/2013 | Song |
| 2013/0222363 A1* | 8/2013 | Chu .................... G06F 3/04815 345/419 |
| 2013/0222381 A1 | 8/2013 | Censo |

* cited by examiner

ZERO PARALLAX DRAWING WITHIN A THREE DIMENSIONAL DISPLAY

PRIORITY DATA

This application is a continuation of U.S. patent application Ser. No. 14/257,623 titled "Zero Parallax Drawing within a Three Dimensional Display", filed Apr. 21, 2014, whose inventors are Peter F. Ullmann and Clifford S. Champion, which claims benefit of priority to U.S. Provisional Application Ser. No. 61/814,315, titled "Free Hand Stylus Interfacing to a Surface", filed Apr. 21, 2013, whose inventors are Bruce J. Bell, Robert F. Biro, Clifford S. Champion, Jonathan J. Hosenpud, Arnold S. Liu, Carola F. Thompson, Jerome C. Tu, Peter F. Ullmann, and Michael A. Vesely, and which are both hereby incorporated by reference in their entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

This disclosure relates to the field of digital display, and more particularly to systems and methods for digitally drawing on virtual three dimensional (3D) object surfaces using a 3D stereoscopic display system.

DESCRIPTION OF THE RELATED ART

Three dimensional (3D) displays (actually, simulated 3D, e.g., via stereo display (SD) techniques) are increasingly utilized for a variety of applications, including, for example, remote viewing, videoconferencing, video collaboration, and so forth.

FIG. 1 illustrates a modern display chain, according to typical prior art embodiments, which includes the following components:

1. GPU—Graphics Processing Unit. This component resides on a personal computer, workstation, or functional equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

2. Scaler—This component takes as input the video levels (e.g., for R, G, and B) for each pixel output from the GPU, and processes them in various ways, before outputting (usually) modified video levels for RGB, usually in the same 8-bit range of 0-255.

3. Panel—This component is the display itself, typically a liquid crystal display (LCD), but other displays are possible, and takes as input the video levels (e.g., for R, G and B) for each pixel as output from the scaler, and converts them to voltages, which are then delivered to each pixel on the display. The panel itself may modify the video levels before converting them to voltages.

The video chain generally modifies the video levels in two ways that have associated shortcomings for stereo displays, specifically, gamma correction, and overdrive. Note that the functionality described above is typically implemented in the scaler, but is sometimes implemented at least partially in other devices or elements of the video chain, e.g., in the GPU or display device (panel).

Time Sequential Stereo Displays

Unlike a normal display, in a stereo display, for each video frame there are two images—right and left. The right image must be delivered to only the right eye, and the left image must be delivered to only the left eye. In a time sequential stereo display, this separation of right and left images is performed in time, i.e., the left and right images are presented sequentially, and thus, contains some time-dependent element which separates these two images. There are two common architectures.

The first architecture uses a device called a polarization switch (PS) which may be a distinct (separate) or integrated LC device or other technology switch, which is placed in front of the LCD panel (or any other type of imaging panel, e.g., an OLED (organic light emitting diode) panel), a plasma display, etc., or any other pixelated panel display used in a time-sequential stereo imaging system, specifically, between the display panel and the viewer, as shown in FIG. 2. The purpose of the PS is to switch the light transmitted from the display panel between two orthogonal polarization states. For example, one of these states may be horizontally linearly polarized light (horizontal linear polarization state), and the other may be vertically linearly polarized light (vertical linear polarization state); however, other options are possible, e.g., left and right circular polarization states, etc., the key feature being that the two polarization states are orthogonal.

This allows achievement of the stereo effect shown in prior art FIG. 3. As may be seen, the top portion of the figure shows the (display) panel switching between a left image and a right image. Synchronous with the panel switching, the PS is switching between a Left State and a Right State, as shown. These two states emit two corresponding orthogonal polarization states, as mentioned above. As FIG. 3 further shows, the system includes stereo eyewear that is designed such that the left lens will only pass the Left State polarization and the right lens will only pass the Right State polarization. In this way, separation of the right and left images is achieved.

The second conventional architecture uses stereo shutter glasses, which replace (or integrate the functionality of) the PS and eyewear. In such systems, each eye is covered by an optical shutter, which can be either open or closed. Each of these shutters is opened and closed synchronously with the display panel in such a way that when the left image is shown on the display, only the left eye shutter is open, and when the right image is shown on the display, only the right eye shutter is open. In this manner, the left and right views are (alternatingly) presented to the user's left and right eyes, respectively.

Interaction With the 3D Display System

Prior art 3D display systems allow the user to interact with displayed content in a variety of ways. As 3D display systems have become more prevalent, more ways to interact with the content have become apparent. For example, users may now interact with displayed content to dissect various animals. Additionally, 3D display systems that allow user interaction have become useful in medical training. Further, a natural extension for 3D display systems is enabling users to draw on a 3D object. In other words, a user may interact with the content by drawing or painting the displayed content in the 3D virtual environment created by the 3D display system.

However, in the prior art, it may be difficult for a user to comfortably draw in the 3D virtual environment. For example, users may find it difficult to hold one hand steady enough to perform suspended mid-air drawing on a negative parallax virtual object without a counter-force. Thus, without the counter-force, it may be difficult for the user to create a smooth continuous mark reminiscent of drawing on a contoured surface, especially if the user is to perform this task for extended periods of time. Thus, the convention in the prior art has been to draw on a solid surface or in the virtual world in two dimensional space on a pad or on a screen. Neither approach allows for actual drawing in the 3D virtual space. Thus, improved techniques for interacting with 3D stereoscopic displays are desired.

SUMMARY

Various embodiments of a system and method for digitally drawing on virtual three dimensional (3D) object surfaces using a 3D stereoscopic display system are presented. The system may include a processor or functional unit, a display screen, and a user control element. The functional unit may be configured to perform digital drawing on virtual 3D object surfaces. Further, in some embodiments, a memory medium may store programming instructions executable by a processor to perform digital drawing on virtual 3D object surfaces.

Thus, in one embodiment a drawing mode of the 3D stereoscopic display system may be enabled. In certain embodiments the drawing mode may be a zero parallax drawing mode. Additionally, in some embodiments, the drawing mode may be enabled by a screen touch-begin or a screen tap-begin event. In an exemplary embodiment, the 3D stereoscopic display system may display a 3D scene on a display screen and the display screen may correspond to a zero parallax plane of the 3D scene. The 3D scene may include surfaces, e.g., a plurality of surfaces, presented in the 3D scene at non-zero parallax planes.

In certain embodiments, first user input at a location on the display screen may be received. The first user input may specify a first surface of the plurality of surfaces presented in the 3D scene at non-zero parallax planes. Note that in certain embodiments the user input may be received via a user control element such as a stylus. Additionally, in some embodiments, the point of view (POV) of the user may be tracked by a head tracking system. Similarly, the position and orientation of the user control element may be tracked by a user control element tracking system.

In an exemplary embodiment, the specified first surface may be selected in response to receiving the first user input. In one embodiment where the first user input may be received via a user control element having a corresponding position, selecting the first surface may include determining an intersection between a query ray and the first surface. The query ray may intersect the zero parallax plane at the corresponding position of the user control element and may have a direction specified by one of a corresponding orientation of the user control element, a corresponding orientation of the user's point of view (POV) relative to the corresponding position of the user control element, an orientation of a defined virtual POV relative to the corresponding position of the user control element, or a default orientation based on one or more of the type of 3D object surface to be drawn upon or a mode of the 3D stereoscopic display system.

Accordingly, the first surface may be rendered and displayed at the zero parallax plane. In some embodiments, a query ray may be used to translate and or rotate the first surface to the zero parallax plane. In one such embodiment where the first user input may be received via a user control element having a corresponding position and a query ray may be used to select the first surface, the first surface may be translated from a non-zero parallax plane to the zero parallax plane along the query ray such that the intersection between the query ray and the first surface is coincident to the corresponding position of the user control element. Similarly, in certain embodiments where the first user input may be received via a user control element having a corresponding position and a query ray may be used to select the first surface, the first surface may be rotated from a non-zero parallax plane to the zero parallax plane such that a normal vector at the intersection between the query ray and the first surface is parallel to a normal vector of the zero parallax plane. Further in certain embodiments, a temporal smoothing function, such as a low pass filter, may be applied to either the rotation or translation described.

In some embodiments, second user input on the display screen specifying drawing motion across the rendered and displayed first surface may be received. The drawing motion may begin at the location of the first user input and may continue to a boundary between the first surface and a second surface. In certain embodiments, the first and second surfaces may be contiguous and the second surface may not be rendered at the zero parallax plane.

Accordingly, the second surface, in response to the drawing motion crossing the boundary, may be rendered and displayed at the zero parallax plane. Additionally, results of the drawing motion on the first and second surfaces may be rendered and displayed. In certain embodiments, rendering and displaying the second surface may include rendering and displaying the first surface at a non-zero parallax plane.

In further embodiments, one or more additional user inputs on the display screen specifying a corresponding one or more additional drawing motions may be received. Note that each of the one or more additional drawing motions may continue to a respective boundary between respective pairs of contiguous surfaces of the plurality of surfaces. Accordingly, a first additional drawing motion of the one or more drawing motions may continue to a boundary between the second surface and a third surface which are contiguous. In such embodiments, in response to the first additional drawing motion, the third surface may be rendered and displayed at the zero parallax and the first and second surfaces may be rendered and displayed with result of the drawing motion and the first additional drawing motion. Note that this process may continue in an iterative manner to additional surfaces until a user disables the 3D drawing mode.

BRIEF DESCRIPTION OF THE DRAWINGS

A better understanding of the present disclosure can be obtained when the following detailed description of the preferred embodiment is considered in conjunction with the following drawings, in which.

Figure 1:
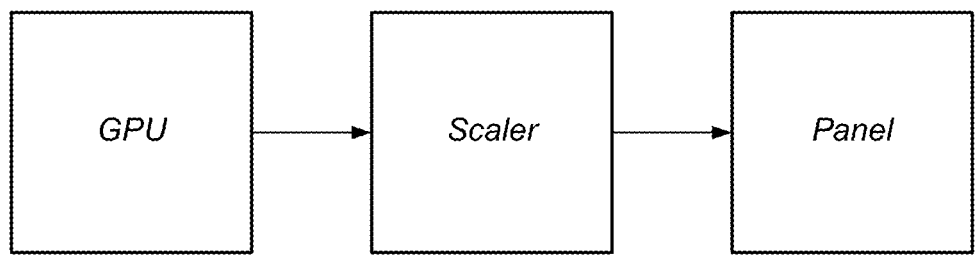
FIG. 1 illustrates a modern display chain, according to the prior art.
Figure 2:
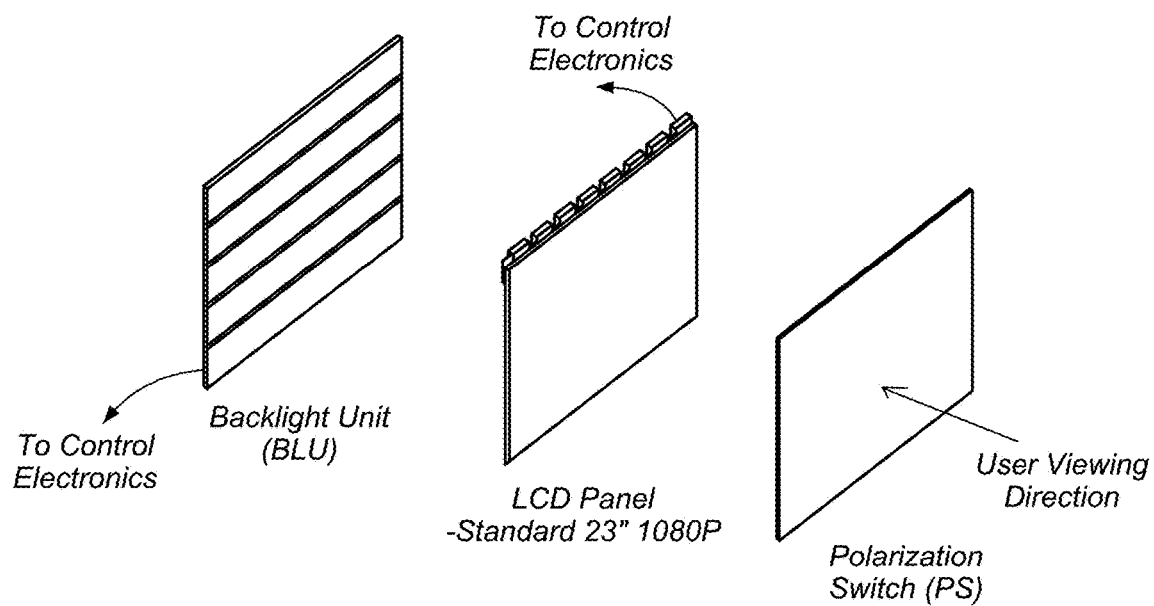
FIG. 2 illustrates an architecture that utilizes a polarization switch, according to the prior art.
Figure 3:
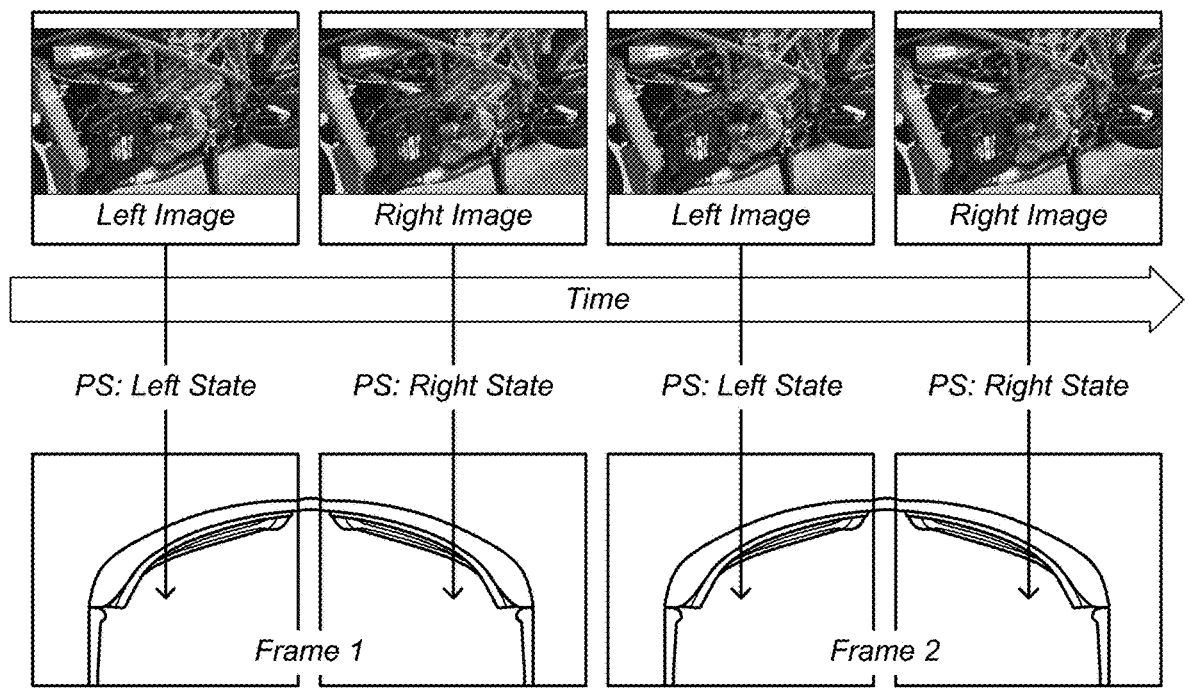
FIG. 3 illustrates a stereo effect (simulated 3D) using polarization switching between left and right views, according to the prior art.

Although the invention is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

Incorporation by Reference

The following references are hereby incorporated by reference in their entirety as though fully and completely set forth herein:

U.S. Pat. No. 8,717,423 titled "Modifying Perspective of Stereoscopic Images Based on Changes in User Viewpoint," issued on May 6, 2014.

Terms

The following is a glossary of terms used in the present application:

This specification includes references to "one embodiment" or "an embodiment."

The appearances of the phrases "in one embodiment" or "in an embodiment" do not necessarily refer to the same embodiment. Particular features, structures, or characteristics may be combined in any suitable manner consistent with this disclosure.

Memory Medium—any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, EEPROM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, or other device or combinations of devices. In general, the term "computer system" can be broadly defined to encompass any device (or combination of devices) having at least one processor that executes instructions from a memory medium.

Graphical Processing Unit—refers to a component that may reside on a personal computer, workstation, or equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

Functional Unit (or Processing Element)—refers to various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Projection—refers to the rendering of a 3D object, or content, using a display device such as a 3D stereoscopic system display on a two dimensional (2D) display. Thus, a projection may be described as the mathematical function applied to objects within a virtual 3D scene to determine the virtual position of the objects within a 3D space that may be defined by the size of the and the point of view or perspective of a user.

Viewpoint—This term has the full extent of its ordinary meaning in the field of computer graphics/cameras and specifies a location and/or orientation. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint (see below) or "physical viewpoint". The term "virtual viewpoint" refers to a viewpoint from within a virtual representation or 3D scene. A viewpoint is synonymous with "point of view" (POV). (See definition of POV below.)

Eyepoint—the physical location (and/or orientation) of a single eye or a pair of eyes. A viewpoint above may correspond to the eyepoint of a person. For example, a person's eyepoint has a corresponding viewpoint.

Point of View (POV)—a position and orientation. For example, a POV may be a viewpoint or eyepoint, generally of a user, but may also be a viewpoint of an optical device, such as a camera. The POV is generally a means to capture a relationship between two or more 6 degree of freedom objects. In a typical application of the present techniques, a user's pair of eyes or head (view) are positioned in any X, Y, Z position and/or pitch, yaw, roll orientation to a display device, e.g., a monitor screen, which may have its own position in any X, Y, Z position and/or pitch, yaw, roll orientation. In this example, the POV can be defined as the position/orientation of the user's view with respect to the positioning/orientation of the display device. The POV determination may be identified by a capture system. In a typical application of the present techniques, one or more tracking devices are attached to the display device, such that the controller knows what the tracking system tracks in the context of the display device, meaning the tracking system, being attached to the display device, is programmatically aware of the position/orientation of the display device, as well as any potential change to the position/orientation of the display device.

The tracking device (which is identifying and tracking the user's view) identifies the position/orientation of the user's view, and this information is then correlated to the tracking system's identification of the viewing device's position/orientation (again, with respect to the display device).

Frustum—refers to the region of virtual space that may be rendered by a stereoscopic 3D display system. May be also referred to as the viewing frustum or view frustum. Although the shape of the region may vary based on the type of camera lens simulated, a frustum is generally the shape of a rectangular pyramid. The planes that cut the frustum perpendicular to the viewing direction may be referred to as the near plane and the far plane.

Coupled Zone—refers to a physical volume in which the user of a 3D stereoscopic system may view 3D content within the human eye's natural depth of field. Put another way, the "coupled zone" of a 3D stereoscopic display may refer to volume defined by a user's viewing angle, the size of the 3D stereoscopic display, and the distances in front of and behind the 3D display in which a user may view objects for an extended period of time without developing eye strain. Thus, the coupled zone of a particular 3D stereoscopic display may also be referred to as the "comfort zone" of the particular 3D stereoscopic display, i.e., the physical volume in which a user may view virtual images for an extended period of time without experiencing eye strain, and thus, discomfort.

Note that in the physical world, when a person sees an object, the person's eyes converge on, or look (individually aim) at, the object. Additionally, as the two eyes converge on the object, each eye's lens also focuses (monoscopically) on the object. In this sense, both eyes focus and converge on the object, thus focus and convergence are "coupled."

In contrast, when looking at a display of 3D stereoscopic system, focus must always remain on the display, whereas the eyes must converge at various depths in order to visualize, or see, the 3D illusion. Thus, focus and convergence appear to "de-couple." Note that when focus and convergence de-couple, eye strain may develop if focus and convergence remain de-coupled for a period of time which may lead to discomfort for the viewer.

Vertical Perspective—a perspective which is rendered for a viewpoint which is substantially perpendicular to the display surface. "Substantially perpendicular" may refer to 90 degrees or variations thereof, such as 89 and 91 degrees, 85-95 degrees, or any variation which does not cause noticeable distortion of the rendered scene. A vertical perspective may be a central perspective, e.g., having a single (and central) vanishing point. As used herein, a vertical perspective may apply to a single image or a stereoscopic image. When used with respect to a stereoscopic image (e.g., presenting a stereoscopic image according to a vertical perspective), each image of the stereoscopic image may be presented according to the vertical perspective, but with differing single viewpoints.

Horizontal or Oblique Perspective—a perspective which is rendered from a viewpoint which is not perpendicular to the display surface For example, the term "horizontal perspective" may refer to a perspective which is rendered using a substantially 45 degree angled render plane in reference to the corresponding viewpoint. The rendering may be intended for a display which may be positioned horizontally (e.g., parallel to a table surface or floor) in reference to a standing viewpoint. "Substantially 45 degrees" may refer to 45 degrees or variations thereof, such as 44 and 46 degrees, 40-50 degrees. Similarly, an oblique perspective may refer to any angle that in not vertical or horizontal. As used herein, a horizontal perspective may apply to a single image or a stereoscopic image. When used with respect to a stereoscopic image (e.g., presenting a stereoscopic image according to a horizontal perspective), each image of the stereoscopic image may be presented according to the distinct horizontal perspective, but with differing single viewpoints.

Another conception of the horizontal perspective as commonly used in this invention is the projection of the intended rendered graphics to the viewing device. With the POV determined, a horizontal or oblique perspective engine may identify the correct graphics frustum in the 3D space, taking into account the position and orientation of the viewing device as defining position and orientation of the render plane of the frustum and the user's view in position and orientation to define camera point of the frustum in relation to the render plane. The resultant projection is then rendered onto the viewing device to be seen by the user.

Position—the location or coordinates of an object (either virtual or real). For example, position may include x, y, and z coordinates within a defined space. The position may be relative or absolute, as desired. Position may also include yaw, pitch, and roll information, e.g., when defining the orientation of a viewpoint.

Stylus—peripheral devices or user control elements such as a handheld device, handheld pen device, handheld pointing device, hand, finger, glove, or any object used to directly interact with rendered virtual objects as in a stereo rendered virtual projected objects.

World Scale—refers to a multiplier used to scale the entire 3D scene being rendered. In general, either the scene objects are scaled within a given frustum or the frustum is scaled with a constant set of scene objects.

Stereo Level—refers to a percentage multiplier of the stereo effect. For example, a 0.50 stereo level would reduce the parallax—both positive and negative—by half.

Field of View—refers to the angle between two rays each starting at the viewer's head position, and passing through the left and right edges of the screen.

Zero Parallax Plane (Position)—refers to the virtual plane associated with the surface of the display screen of a 3D display system independent of the head position or viewpoint of the user relative to the display screen.

Zero Parallax Offset—refers to a constant offset to the 3D scene render to move the zero-parallax plane position in the scene.

Head-tracking Scale—refers to a scaling factor used as a multiplier of the user's actual head movements. May be used to create the impression of greater or lesser movement.

Inter-pupillary Distance—refers to the distance between the left eye and right eye cameras in a 3D rendering system.

Approximately—refers to a value that is almost correct or exact within some specified tolerance. For example, approximately may refer to a value that is within 1 to 10 percent of the exact (or desired) value. It should be noted, however, that the actual threshold value (or tolerance) may be application dependent. For example, in one embodiment, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Comprising—this term is open-ended. As used in the appended claims, this term does not foreclose additional structure or steps. Consider a claim that recites: "A system comprising a display . . . ." Such a claim does not foreclose the apparatus from including additional components (e.g., a voltage source, a light source, etc.).

Configured To—various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

First, Second, etc.—these terms are used as labels for nouns that they precede, and do not imply any type of ordering (e.g., spatial, temporal, logical, etc.). For example, in a system having multiple tracking sensors (e.g., cameras), the terms "first" and "second" sensors may be used to refer to any two sensors. In other words, the "first" and "second" sensors are not limited to logical sensors 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Figure 4:
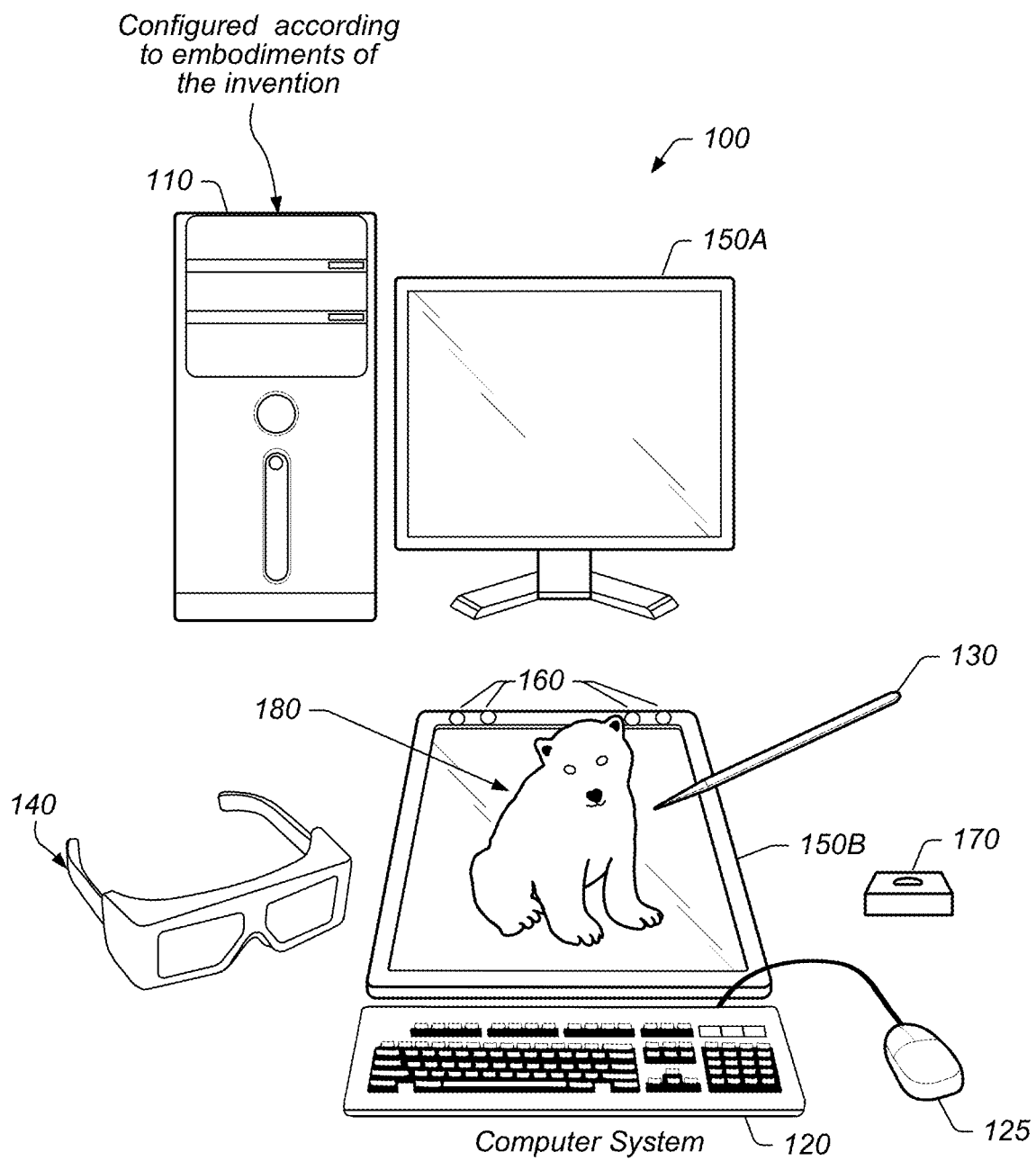
FIG. 4 illustrates a stereoscopic 3D display system according to embodiments.

FIG. 4—Exemplary System

FIG. 4 illustrates an exemplary system that may be configured to perform various embodiments described below.

In the embodiment of FIG. 4, computer system 100 may include chassis 110, display 150A and display 150B (which may collectively be referred to as display 150 or "at least one display" 150), keyboard 120, mouse 125, user control element 130, eyewear 140, at least two cameras 160, and stylus caddy 170. Note that in some embodiments, two displays 150A and 150B may not be used; instead, a single display 150 may be used in such embodiments. In various embodiments, at least one of the displays 150A and 150B may be a stereoscopic display. For example, in one embodiment, both of the displays 150A and 150B may be stereoscopic displays. Or, in other embodiments, the single display 150 may be a stereoscopic display. It is noted that a stereoscopic display may also be configured to display two-dimensional (2D) objects and may be configured to operate in a 2D mode.

The chassis 110 may include various computer components such as processors, at least one memory medium (e.g., RAM, ROM, hard drives, etc.), graphics circuitry, audio circuitry, and other circuitry for performing computer tasks, such as those described herein. The at least one memory medium may store one or more computer programs or software components according to various embodiments of the present invention. For example, the memory medium may store one or more graphics engines which are executable to perform some of the techniques described herein. In certain embodiments the graphics engine may be implemented on or by a functional unit or processing element. As used herein, and as noted in the Terms section above, the term functional unit or processing element refers to various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

The memory medium may also store data (and/or program instructions) (e.g., implementing or specifying a computer model) representing a virtual space, which may be used for projecting a 3D scene, such as scene 180, of the virtual space via the display(s) 150. Further, one or more memory mediums may store software which are executable to perform three-dimensional spatial tracking (e.g., user view tracking, user control tracking, etc.), content processing, or other features, as described herein. Additionally, the memory medium may store operating system software, as well as other software for operation of the computer system. Various embodiments further include receiving or storing instructions and/or data implemented in accordance with the foregoing description upon a carrier medium.

As indicated above, the computer system 100 may be configured to display a three dimensional (3D) scene (e.g., via stereoscopic paired images), or 3D content, such as scene 180, using the display 150A and/or the display 150B. The computer system 100 may also be configured to display a "view" of the 3D scene using the display 150A, the display 150B, and/or another display, either fixed in position and orientation or movable in position and orientation, as described in more detail below. The "view" of the 3D scene, or content, may refer to a displayed portion of the 3D scene from a viewpoint within the 3D scene. A viewpoint within the 3D scene may be referred to as a "virtual viewpoint". The view may be stereoscopic, e.g., may be displayed on a stereoscopic display. Alternatively, the view may be monoscopic (not stereoscopic), and may be displayed on either a monoscopic display or a stereoscopic display. Note that a monoscopic image or scene displayed on a stereoscopic display may appear the same as on a monoscopic display system.

It should be noted that the embodiment of FIG. 4 is exemplary only, and other numbers of displays are also envisioned. For example, the computer system 100 may include only a single display or more than two displays, the displays may be arranged in different manners than shown, or the displays may be portable. In this particular embodiment, the display 150A is configured as a vertical display (which is perpendicular to a user's line of sight) and the display 150B is configured as a horizontal display (which is parallel or oblique to a user's line of sight). The vertical display 150A may be used (e.g., via instructions sent by a graphics engine executing in the chassis 110) to provide images which are presented according to a vertical (or central) perspective and the display 150B may be used (e.g., via instructions sent by a graphics engine executing in the chassis 110) to provide images which are presented according to a horizontal perspective. Descriptions of horizontal and vertical perspectives are provided herein. Additionally, while the displays 150 are shown as flat panel displays, in other embodiments, they may be any type of system which is capable of displaying images, e.g., projection systems. For example, display(s) 150 may be or include, for example, a CRT (cathode ray tube) monitor, a LCD (liquid crystal display) monitor, or a front projection or a back projection screen or surface with a plurality of projectors, among others. Display(s) 150 may include a light emitting diode (LED) backlight or other type of backlight.

Either or both of the displays 150A and 150B may present (display) stereoscopic images for viewing by the user. By presenting stereoscopic images, the display(s) 150 may present a 3D scene conveying depth for the user. This conveyed depth 3D (i.e., 3D) scene may be considered or referred to as an illusion or simulated 3D since the actual provided images are 2D, but the scene is conveyed in 3D via the user's interpretation of the provided images. In order to properly view the stereoscopic images (one for each eye for each image frame), the user may wear eyewear 140. Eyewear 140 may be any of anaglyph glasses, polarized glasses, shutter glasses, lenticular glasses, etc., among others. In embodiments using anaglyph glasses, images for a first eye are presented according to a first color (and the corresponding lens has a corresponding color filter) and images for a second eye are projected according to a second color (and the corresponding lens has a corresponding color filter). With polarized glasses, images are presented for each eye using orthogonal polarizations, and each lens of the eyewear has the corresponding orthogonal polarization for receiving the corresponding image. With shutter glasses, each lens is synchronized with respect to left and right eye images provided by the display(s) 150, e.g., in alternating fashion. The display may provide both polarizations simultaneously or in an alternating manner (e.g., sequentially), as desired. Thus, the left eye may be allowed to only see left eye images during the left eye image display time and the right eye may be allowed to only see right eye images during the right eye image display time. With lenticular glasses, images form on cylindrical lens elements or a two dimensional array of lens elements. Note that some displays may be an autostereo display and include lenticular lenses on the display itself negating the need for complementary glasses. The stereoscopic image may be provided via optical methods, where left and right eye images are provided only to the corresponding eyes using optical means such as prisms, mirror(s), lens(es), and the like. Large convex or concave lenses can also be used to receive two separately projected images to the user.

In one embodiment, eyewear 140 may be used as a position input device to track the user view (e.g., eyepoint or point of view (POV)) of a user viewing a 3D scene presented by the system 100. For example, eyewear 140 may provide information (e.g., position, orientation, etc.) that is usable to determine the position and orientation of the point of view of the user, e.g., via triangulation. In some embodiment, the position input device may use a light sensitive detection system, e.g., may include an infrared detection system to detect the position of the user's head to allow the user freedom of head movement. Other embodiments of the input device(s) may use the triangulation method of detecting the user point of view location, such as one or more sensors (e.g., two cameras, such as CCD cameras) providing position and/or orientation data suitable for the head or eye tracking. In a particular embodiment, the one or more sensors may perform feature recognition to recognize features on the user's head or face to provide the position and or orientation data suitable for the head or eye tracking. The input device(s) may be manually operated by the user, such as a keyboard, mouse, trackball, joystick, or the like, or combinations thereof, to indicate the correct display of the horizontal perspective display images. However, any method for tracking the position of the user's head or point of view may be used as desired. Accordingly, the 3D scene may be rendered from the perspective (or point of view) of the user such that user may view the 3D scene with minimal distortions (e.g., since it is based on the point of view of the user). Thus, the 3D scene may be particularly rendered for the point of view of the user, using the position input device.

The relationships among the position/orientation of the display(s) 150 and the point of view of the user may be used to map a portion of the virtual space to the physical space of the system 100. In other words, the orientation of the physical display may be determined and conveyed to the display plane of the frustum and create a one to one correspondence between the identified position and orientation of the display, or display plane, to the frustum render plane. In essence, the physical space and components used may be mapped to the virtual model in order to accurately render, in terms of perspective to projection, a 3D scene of the virtual space.

One or more of the user input devices (e.g., the keyboard 120, the mouse 125, the user control element 130, pointing device, user control device, etc.) may be used to interact with the presented 3D scene. For example, a user control element may be used to directly interact with the virtual objects of the 3D scene (via the viewed projected objects). Thus, the user control element 130 (shown as a stylus) or simply the user's hands may be used to directly interact with virtual objects of the 3D scene. Such direct interaction may be possible with "open space" portions of the 3D scene, i.e., the area between the display and the user. Thus, at least a portion of the 3D scene may be presented in this "open space", which is in front of or otherwise outside of the at least one display. In some embodiments, at least a portion of the 3D scene may appear as a hologram above the surface of the display 150. For example, when the horizontal display 150B is used, the 3D scene may be seen as hovering above the horizontal display. Note that when presenting the 3D scene on the horizontal display, the position and orientation of the display to the user's viewpoint may be correlated to the frustum's render plane when rendering the 3D scene. Additionally, it should be noted, that a portion of the 3D scene may also be presented as appearing behind the display surface, which is not in "open space". Thus, "open space" refers to a space which the user is able to freely move in and interact with (e.g., where the user is able to place his hands in the space), as opposed to a space the user cannot freely move in and interact with (e.g., where the user is not able to place his hands in the space, such as below the display surface). However, in the case where the user may not place his hands in the space, the user may use a scene generating virtual extension that appears to the user to be able to virtually manipulate virtual objects not appearing the "open space". Thus, "open space" may be considered to be a "hands-on volume" as opposed to an "inner-volume", which may be under the surface of the display(s). Thus, the user may interact with virtual objects in the open space because they appear as being proximate to the user's own physical space. Said another way, the inner volume is located behind (or under) the viewing surface, and so presented objects appear to be inside the physical viewing device. Thus, objects of the 3D scene presented within the inner volume do not share the same physical space with the user and the objects therefore cannot be directly and physically manipulated by hands or hand-held tools such as user control element 130 shown as a stylus. Rather, they may be manipulated indirectly, e.g., via a computer mouse, a joystick, or virtual representations of hands, handheld tools, or a stylus.

In some embodiments, system 100 may include one or more sensors 160. The one or more sensors 160 may be included in a point of view (POV) tracking system. In certain embodiments, the one or more sensors 160 may be affixed to one or more reference points attributable to the display and may provide a correlation of position and orientation of what is tracked to the position and orientation of the display. FIG. 4 illustrates an embodiment using four cameras 160. For instance, two of the four cameras 160 may be used to sense a user view (e.g., point of view) and the other two cameras 160 may be used to sense a user control element (e.g., pointing device, stylus, hand, glove, one or more fingers, etc.). Sensors 160 may be used to image a user of system 100, track a user's movement, or track a user's head or eyes, among other contemplated functions. In one embodiment, cameras 160 may track a position and/or an orientation of user control element 130. The information regarding the position and/or orientation of the user control element 130 provided by the one or more sensors 160 may be used in conjunction with other positional information of the system (e.g., an accelerometer and/or gyroscope within the stylus itself) to perform more precise 3D tracking of the user control element 130. The one or more sensors 160 may be spatially separated from one another and placed in a position to view a volume that encompasses where a user will view stereo imagery. Sensors 160 may also be far enough apart from each other to provide for a separation of view for a true three-axis triangulation determination. System 100 may also include a caddy 170 to store user control element 130. Caddy 170 may also be used to calibrate the orientation of the stylus to a known roll, pitch, and yaw, and so may be in a fixed position relative to cameras 160.

In one embodiment, the system 100 may be configured to couple to a network, such as a wide area network, via an input. The input may be configured to receive image data over the network from a system similar to system 100. In other embodiments, a POV tracking system may include cameras 160. Cameras 160 may be configured to provide visual information regarding a user such that a POV, e.g., the position and orientation, of the user may be determined. However, it should be noted that any type of various POV tracking techniques or devices may be used as desired. Note that as used herein, point of view (POV) of a user refers to the perspective or POV from which a user optically views an object or image, i.e., a user's visual POV, and thus is defined with respect to the display device of the system. In some embodiments, the POV may be a 6 degree of freedom (6DOF) POV, e.g., three position coordinates and three orientation coordinates, although any POV may be used as desired, e.g., three position coordinates and two or three orientation coordinates, and so forth.

Note that in some embodiments, the POV tracking system may rely at least in part on the components of chassis 110 to determine the POV, e.g., via execution of one more programs on a processor or functional unit of chassis 110, although in other embodiments the POV tracking system may operate independently, e.g., may have its own processor or functional unit.

In certain embodiments, the system may include components implementing a perspective based image capture system, for capturing images of target object at a location remote from the system. For example, the perspective based image capture system may include an input configured to couple to a network for receiving information regarding a point of view (POV) from a POV tracking system at a remote location. The information regarding the POV may indicate a position and/or orientation of a remote user. The perspective based image capture system may further include another image capture system for capturing images of a target object. More specifically, the image capture system may be configured to capture one or more images from a first perspective based on the information regarding the POV received by the input.

The user may be able to specify or otherwise manipulate a virtual viewpoint within the 3D scene presented by the display(s) 150. A view of the 3D scene may be presented based on the virtual viewpoint, either by one or more of the display(s) 150 or another display, as desired. This view of the 3D scene may be stereoscopic or monoscopic, as desired. Note that in some embodiments, the virtual viewpoint may change as a user's eyepoint(s) changes. Additionally, the user's eyepoint(s) may be tracked by a tracking system as described above.

A 3D scene generator (e.g., content processing system) stored and executed in the chassis 110 may be configured to dynamically change the displayed images provided by the display(s) 150. More particularly, the 3D scene generator may update the displayed 3D scene based on changes in the user view, user control (e.g., manipulations via the user input devices), etc. Such changes may be performed dynamically at run-time, and may be performed in real-time. The 3D scene generator may also keep track of peripheral devices (e.g., eyewear 140) and/or user control elements (e.g., user control element 130) to ensure synchronization between the peripheral devices and/or the user control elements, the frustum, the frustum render plan, the rendering, and the corresponding displayed images. The system may further include a calibration unit to ensure proper mapping of the peripheral device to the display images and proper mapping between the projected rendered images and the virtual images stored in the memory of the chassis 110.

Thus, the system 100 may present a 3D scene which the user may virtually interact with in real time. The system may comprise real-time electronic display(s) 150 that may present or convey projected images in the open space based on the perspective of the user, and a peripheral device or user control element 130 that may allow the user to interact with the 3D scene with hand controlled or hand-held tools. The system 100 may also include means to manipulate the displayed image such as magnification, zoom, rotation, movement, and even display a new image. However, as noted above, in some embodiments, the system may facilitate such manipulations via the user's hands, e.g., without hand-held tools.

Further, while the system 100 is shown as including horizontal display 150B since it simulates the user's visual experience with the horizontal ground, other viewing surfaces may offer a similar 3D illusion experience. For example, the 3D scene may appear to be hanging from a ceiling by projecting the horizontal perspective images onto a ceiling surface, or may appear to be floating from a wall by projecting horizontal perspective images onto a vertical wall surface, or may be a user handheld device, where the scene may either appear to be moving in space with the movement of the portable device or the portable device may appear to be moved away, thereby passing by the scene. More generally, any other variations in display orientation and perspective (or any other configuration of the system 100) may be used as desired.

Thus, in one embodiment, system 100 may be configured to perform zero parallax drawing (ZPD). In other words, a memory medium of system 100 may store programming instructions executable by a processor or functional unit of system 100 to perform ZPD. ZPD generally refers to a drawing mode of system 100 that may enable an efficient way for users, via a user control element, such as user control element 130, to perform digital painting or drawing on the surface of a virtual 3D model or other 3D object surface representation. In other words, the programming instructions may allow a user to interact with the displayed content of the 3D display system in a manner that simulates drawing or painting of or on a virtual 3D model or other (simulated) 3D surface. In one embodiment, in order to perform the drawing or painting interaction, the user may drive the stylus at a physical surface of the display hardware in accordance with existing 2D touch-screen painting applications. However, unlike existing 2D touch-screen painting or drawing, the 3D display system may dynamically reposition by re-rendering the target 3D model in the virtual 3D space as the user control element (e.g., the user's painting device, stylus, one or more fingers, etc.) is moved across the display surface, thus allowing the user to experience drawing in 3D. In other words, the user experience is one of drawing directly onto a firm surface that correlates in position and orientation to the repositioned 3D object. Additionally, the system may dynamically reposition the target 3D model or content within the 3D space such that the perceived surface of the 3D model may be repositioned in position and/or orientation to remain coincident with the stylus tip at the display surface.

In one embodiment, the user control element 130 may be tracked by system 100 via a POV tracking system that may utilize cameras 160. Alternatively, or in addition, the user control element 130 may include feedback devices such as accelerometers, gyroscopes, magnetometers and the like that may allow or aid system 100 in tracking user control element 130. Thus, system 100 may use the position and orientation of user control element 130 to determine a portion of the displayed content that is an object of current interest. In other words, the position and orientation of the object of current interest in proximity of user control element 130 may be determined by system 100 via tracking of the POV of user control element 130. Hence, if the user is in the drawing (or marking or painting) mode and a tip of the user control element is positioned at zero parallax on the display surface, system 100 may determine that the object of interest is not at a corresponding zero parallax position. Note that the zero parallax position, or plane, generally refers to the plane associated with the surface of the display screen of a 3D display system independent of the head position or viewpoint of the user relative to the display screen. Note further that the zero parallax position, or plane, may correspond to the render plane of the frustum in the virtual 3D space. Thus, in one embodiment, the zero parallax plane may be defined as the plane corresponding to the display screen of display 150B and, as noted, also corresponds to the frustum render plane. Further, it should be noted that the in-plane location of interest on the display screen may correspond to an in-plane position on the display plane which may correlate to a corresponding in-plane position on the frustum render plane.

In response to determining that the object of interest is not at the zero parallax position, the system may shift, or reorient, the object of interest within the 3D scene such that the closest part of the object under the user control element, or the closest part of the object proximate to the tangent to the display at the position of a tip of the user control element, may be shifted to, or reoriented at, the zero parallax position. In certain embodiments, this may include shifting, or reorienting, the entire 3D scene. Alternatively, a portion of, or only the to-be-drawn virtual object, may be shifted or reoriented.

In one embodiment, the object of interest may be shifted to, or placed for rendering at, the zero parallax plane allowing a user to virtually draw or paint the object of interest using a user control element such as a stylus. In such embodiments, the user control element may be placed on the display screen of the 3D display system such that the display screen may provide the user with both a resting position for the user's arm/stylus as well as a counter force for the drawing activity. In some embodiments, the counterforce of the display screen surface may facilitate a pressure sensitive user control element, such that the force the user may engage the user control element to the display surface may enable special drawing functions (e.g. bolding of a drawing rendering). Note that as the user moves the user control element in the drawing action, the system may reposition, or reorient the object of interest to ensure the object of interest, or the changing portion of the object of interest, under the user control element may remain in the zero parallax plane.

In another embodiment, the user may draw using a user control element on the surface of the display screen and instead of the object of interest being repositioned to the zero parallax plane, the user control element may have a conveyed virtual projected beam where virtual projected beam terminates on the object to be drawn. In other words, the user may still rest the user control element on the display screen; however, the user would virtually draw using a virtual beam projected from the contact point of the user control element on the display screen to a location on the object of interest. Thus, as the object is likely with a 3D form, the extended and contracted virtual beam to the object may show where the virtual drawing is occurring on the object without the object shifting to the zero parallax plane while still allowing the user to use the screen surface as the canvas for the stylus based drawing. Note that this particular embodiment may be implemented for objects of interest in a positive parallax position, i.e., the opposite side of the display screen from the user.

It should be noted, that the embodiments described above are but a few of the possible variations of drawing on a fixed surface as correlated to a 3D graphic model. Thus, in certain embodiments there may be an offset in one or more directions (x, y, and z offsets) or orientations from the user control element position of what object should be drawn and how the system draws on the 3D object in the context of the drawing motion of the user control element on the hard surface. Furthermore, the drawing via the user control element may not be on the display surface, but may instead be located on a discrete separate surface, where the separate surface is mapped to the zero parallax of the frustum render plane. Additionally, the surface may not be flat, but may have a direct correlation to the 3D scene presented to the user. In other words, the surface may be separate and discrete from the display screen and may be mapped to the 3D virtual space defined by the 3D scene presented to the user.

Zero Parallax Drawing Software

In an exemplary embodiment of the above described system, the programming instructions, or software, may be structured such that the software includes three interrelated processes: a state machine, a zero parallax surface alignment (ZPSA) process, and a stroke capture process. In certain embodiments the software may be referred to as zero parallax drawing (ZPD) software. In such an embodiment, the ZPD software may assume that various features of the system disclosed above are readily available to the ZPD software. Thus, for example, the ZPD software may assume the availability of user control element tracking, including real-time data containing user control element position, hover begin and end events, and draw (paint) being and end events. Further, the ZPD software may assume that the system provides read and write access to the virtual camera, target models, and raycast and collision queries. Additionally, the ZPD software may require access to the stereoscopic mapping of the system. In other words, the ZPD software may require knowledge of the virtual locations of zero parallax, display surface, and user's head location, among other reference points and positions. Further, the ZPD software may assume that the system provides the mapping between the display surface position and orientation to the frustum render plane position and orientation in context of the perspective of the user's POV. Also, the ZPD software may provide output stroke events, or stroke responses, to other software processes included in the system.

Figure 5:
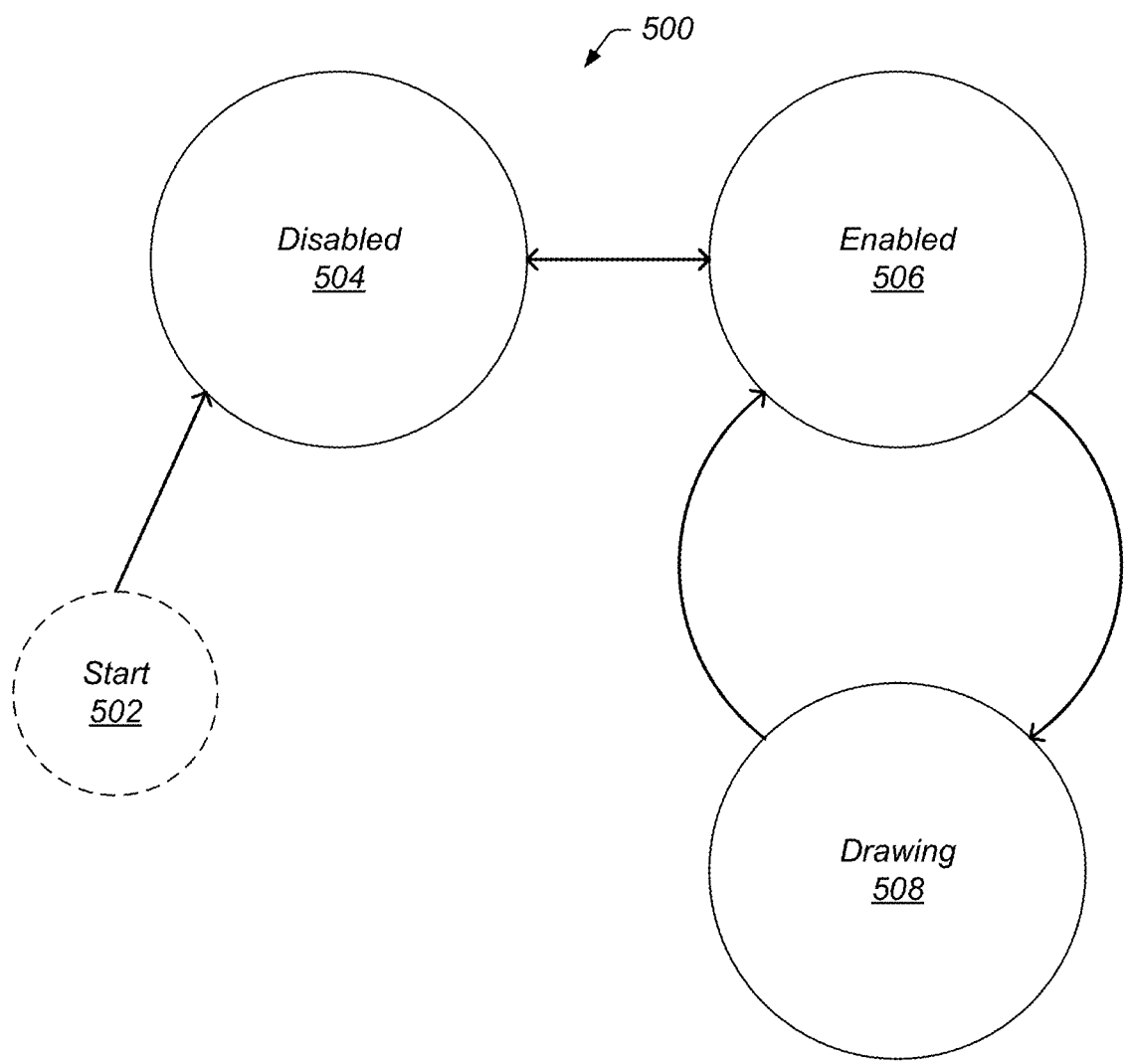
FIG. 5 illustrates a state machine of the ZPD software according to an exemplary embodiment.

FIG. 5 illustrates a state machine of the ZPD software according to an exemplary embodiment. Thus, as illustrated, state machine 500 may include start, or initialization, state 502 and at least three additional high-level states: disabled state 504, enabled state 506, and drawing state 508. Note that a state change may be triggered by user input, while the currently active state may affect behavior of ZPD software processes.

After state machine 500 is initialized or started at 502, state machine 500 may transition to a default state. In certain embodiments the default state may be disabled state 504. In such embodiments, transition from disabled state 504 to enabled state 506 may be triggered by various events, such as a screen touch-begin event, where the system may recognize or determine that the user control element is in contact with the display surface via a user control element tracking system or a display sense system (e.g., a touch screen) included in the 3D display system. In certain embodiments, the transition from disabled state 504 to enabled state 506 may be triggered by a screen tap-begin event, where the system may recognize or determine that the user control element has contacted the display surface via a user control element tracking system or a display sense system (e.g., a touch screen). Conversely, transition from enabled state 506 to disabled state 504 may be triggered by various other events, such as a screen touch-end event, where the system may recognize or determine that the user control element is no longer in contact with the display surface, from the user control element tracking system or the display sense system. In certain embodiments, the transition from enabled state 506 to disabled state 504 may be triggered by a screen tap-end event, where the system may recognize or determine that the user control element has contacted the display surface via a user control element tracking system or a display sense system (e.g., a touch screen).

In certain embodiments, transition from enabled state 506 to drawing state 508 may be triggered by the ZPD software receiving a draw-begin event from the user control element tracking system, based on the position of a tip of the user control element on the display surface for a given period of time, or the motion of the tip of the user control element once moving across the display surface and/or in conjunction with a particular mode of the system, as in a pen or brushstroke mode and in conjunction with the proximity of an object to the tip of the user control element. Similarly, transition to enabled state 506 from drawing state 508 may be triggered by the ZPD software receiving a draw-end event from the user control element tracking system, based on a change of mode or a lifting of the tip of the user control element off the display surface for a given period of time.

As mentioned above, the currently active state may affect behavior of ZPD software processes. Thus for example, when state machine 500 is in disabled state 504, no additional ZPD software processes may be active. In other words, no ZPD software processes other than state machine 500 may be active when state machine 500 is in disabled state 504. Further, in certain embodiments, zero parallax surface alignment (ZPSA) process may be active when state machine 500 is in enabled state 506. Additionally, stroke capture process may be active when state machine 500 in in drawing state 508.

In one embodiment, the ZPSA process may be configured to shift or reposition a target 3D model (object of interest), such that, when the object is re-rendered, a point on the surface of the 3D target model may be brought into alignment with the zero parallax plane. In an exemplary embodiment, the ZPSA process may be further configured to reorient the target 3D model in order to align the 3D model with the zero parallax plane. Note that the ZPSA process may be a real-time iterative process that may continue to iterate in real-time until disabled. Thus, as the user may move the tip of the user control element across the display surface, the system may re-render the object in real time, such that the point of the object tangent to the tip of the user control element may be constantly repositioned and/or reoriented to be rendered in a manner to appear to be normal to the display surface at zero parallax or to a transposed virtual display plane proximate to a virtual extension of the tip of the user control element.

In a specific embodiment, one iteration of the ZPSA process may include a raycast query to determine a target surface point (TSP) on the target model and a repositioning of the target model or virtual camera to bring the TSP in alignment with the zero parallax plane. Additionally, in certain embodiments, the iteration of the ZPSA process may include a reorientation of the target model such that the normal vector of the model at the TSP is aligned with the normal vector of the zero parallax plane (negligible of any sign difference). Note that such an embodiment may be advantageous in situations where the target 3D model may have a high curvature.

Note additionally, that the ZPSA process may be a stateful process in that a target 3D model must be selected at the start of the ZPSA process and that the most recent TSP is remembered between iterations.

Figure 6A:
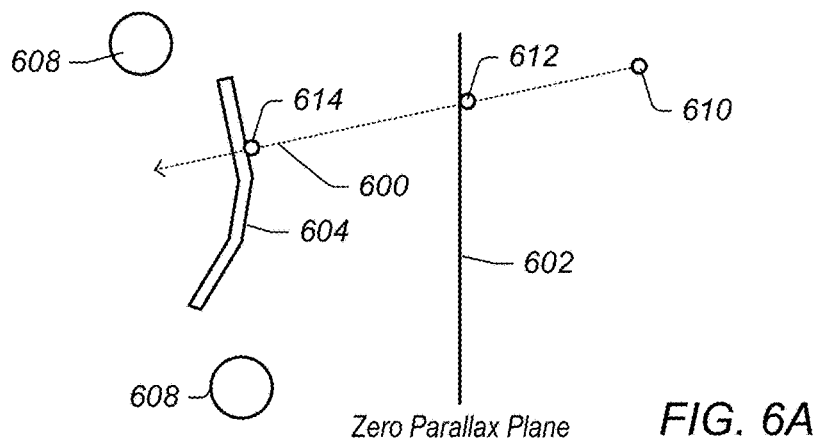
FIGS. 6A-6C illustrate exemplary examples of raycast techniques according to embodiments.
Figure 6B:
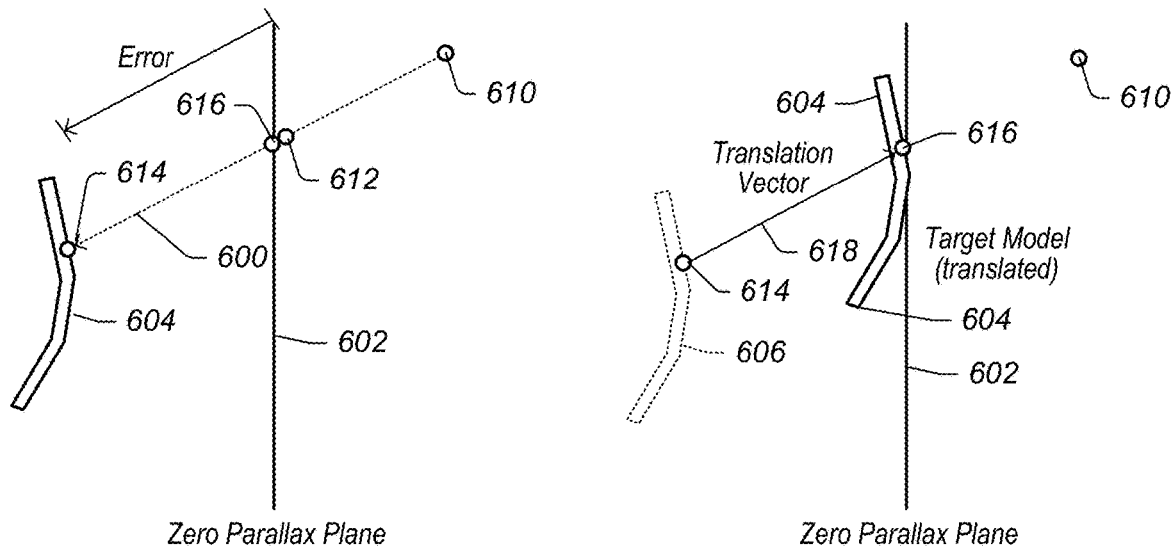
Figure 6C:
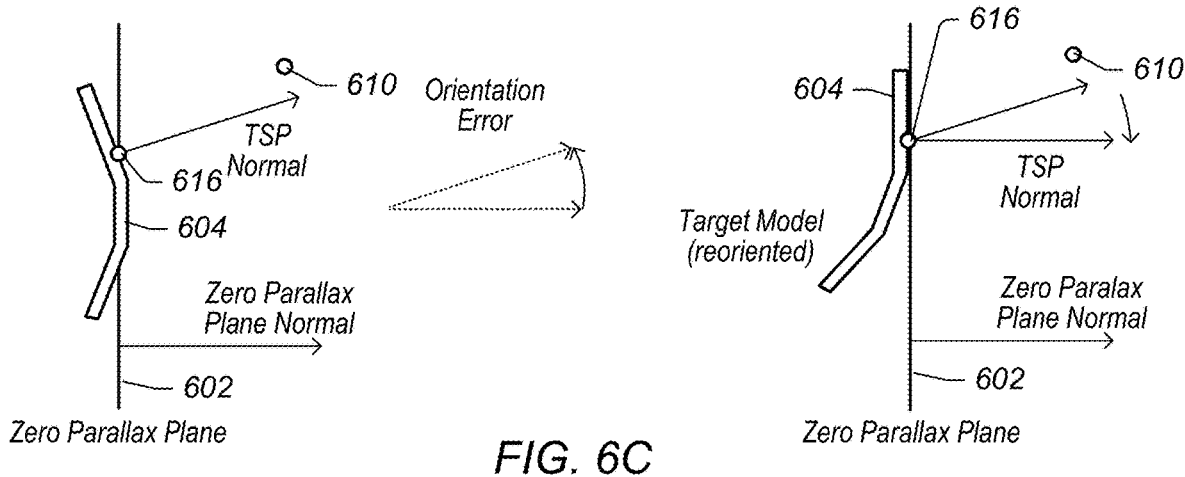
Figure 7:
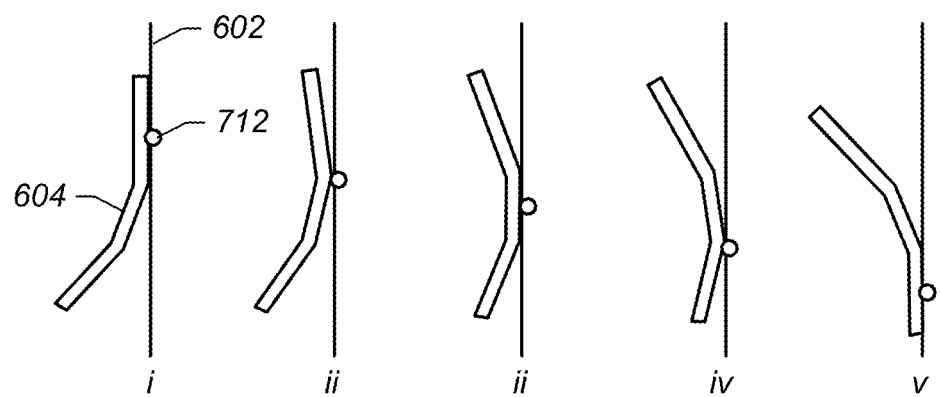
FIG. 7 illustrates an example stroke according to embodiments.
Figure 8A:
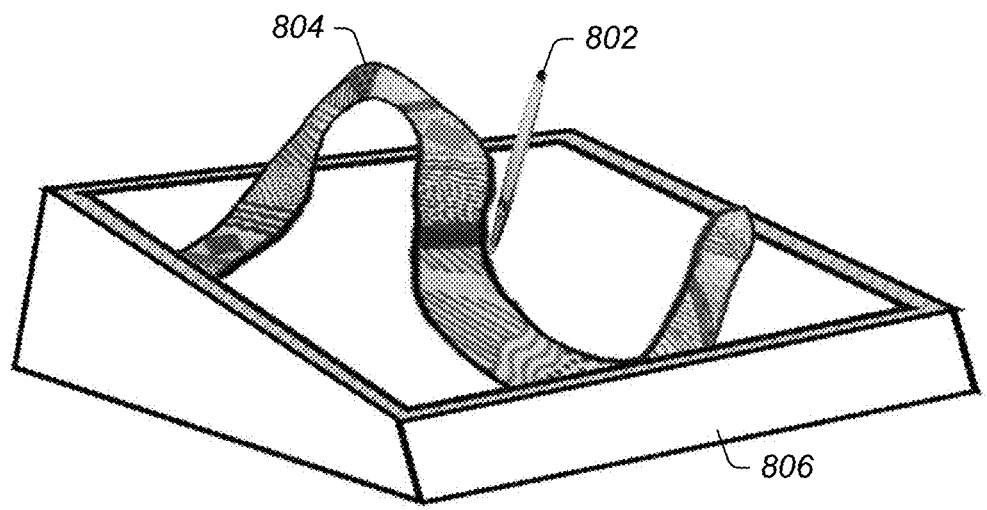
FIG. 8A-8D are illustrations of results from exemplary stroke captures according to embodiments.
Figure 8B:
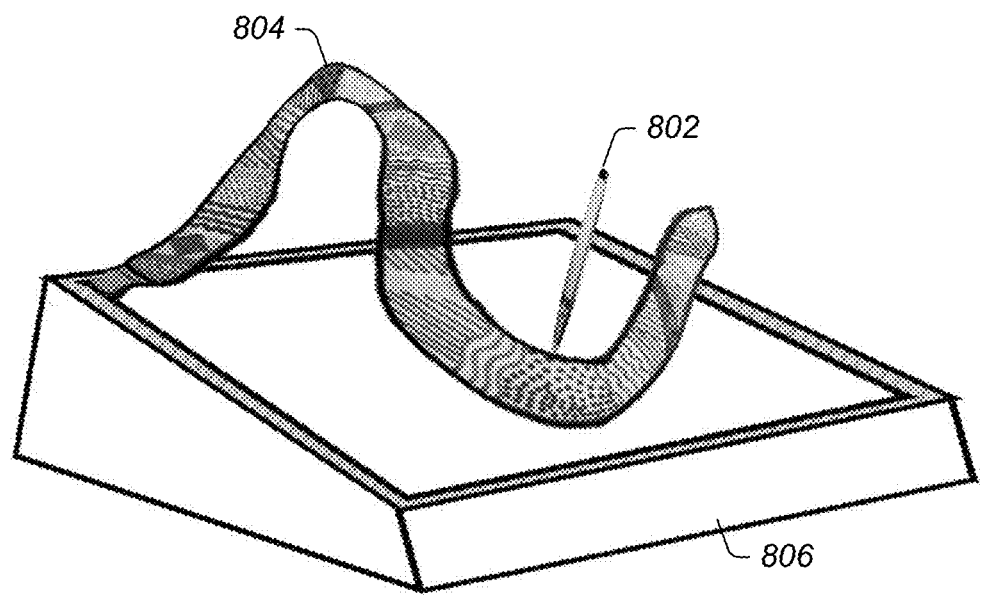
Figure 8C:
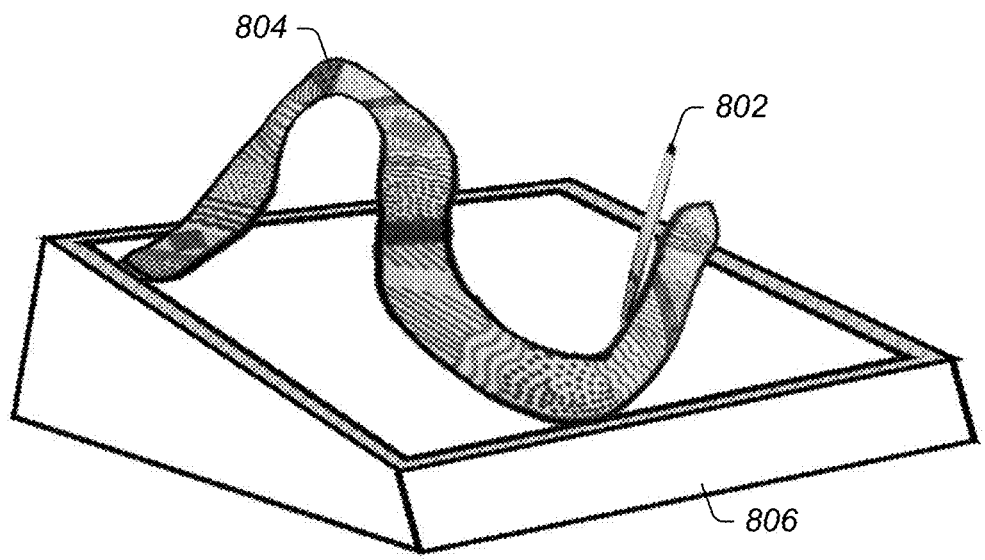
Figure 8D:
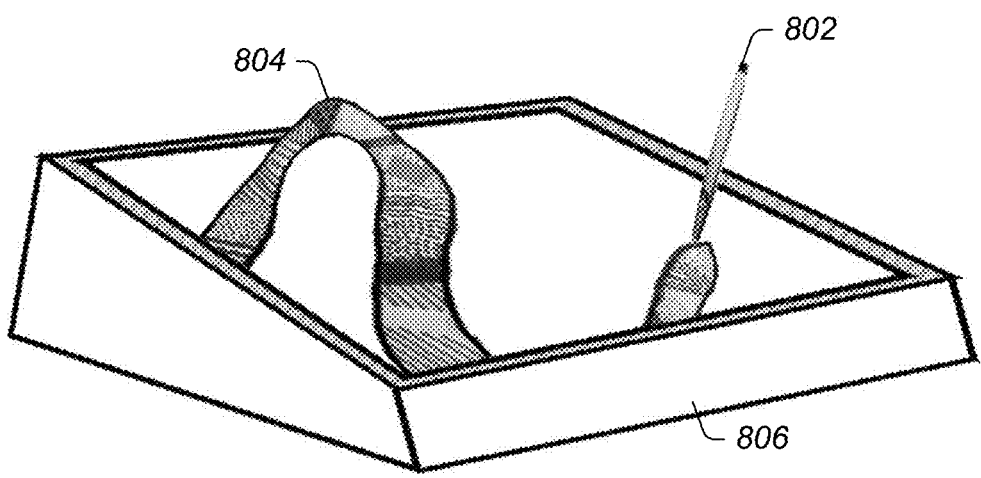

FIGS. 6-7: Exemplary Illustrations of Raycast

FIGS. 6-7 illustrate exemplary examples of raycast techniques that may be included in the ZPSA process according to various embodiments of the invention. FIG. 6A illustrates an initialization of a raycast query ray. Note that the initial raycast query ray may be generated at the start of a process or as a continuation, i.e., iteration of the process. Thus, although FIG. 6A is described in terms of initialization, the description is equally suitable to describe a continuation or iteration of the process. Thus, as shown, query ray 600 may be formed by starting at a virtual location 610 of a user's head. In some embodiments, the query ray 600 may be formed by starting at a virtual location 610 of a user control element angle as it is oriented to the display surface. In other embodiments, the query ray 600 may be formed by starting at a virtual location 610 based on the type of object 604 (e.g., a surface) to be drawn upon or a mode of the system. In certain embodiments, the query ray 600 may be formed by starting at a virtual location 610 as defined by a default of the system. It should be noted that any combination of the above may influence the position of raycast starting virtual location 610. For simplicity, the process will be described using virtual location 610 of the user's head as the start point of query ray 600, but it should be apparent that any point 610 may be used as the start point of a raycast. In other words, via the use a head tracking system as described above in reference to FIG. 4, the position of the user's head may be mapped to a virtual location relative to zero parallax plane 602. Alternatively, a virtual location of a monoscopic camera may be used as the start point of query ray 600. Query ray 600 extends from virtual location 610 in a direction collinear with a virtual location 612 of the endpoint of a user control element, such as a stylus tip. In other words, via the use of a user control element tracking system as described above in reference to FIG. 4, the position of the user control element may be mapped to a virtual location relative to zero parallax plane 602. Query ray 600 may continue to extend linearly from virtual location 612 until a first hit, or intersection, with scene 608 is determined. Note that during initialization, the first hit may identify target 3D model 604 and first target surface point 614. In certain embodiments, limits on distance and filtering rules may be applied to aid in the determination of the first hit. Additionally, it should be noted that when query ray 600 is cast during continuation of the process, the target 3D model may be known, thus the query may only return results incident to the current target 3D model. Additionally, it should be noted that the query ray 600 may be determined by the system, based on the tracking system's identification of a user control element in conjunction with the ZPD software's determination of the virtual location 610 and the target surface point 614.

Further, note that TSP 614 may also be influenced by the position of the user control element, and more specifically, the virtual location of the endpoint of the user control element. Thus, as the user control element is moved along zero parallax plane 602, the raycasting will track the current position of the user control element tip and reorient target 3D model 604 such a new TSP is identified.

The raycast technique described above may be appropriate for 3D target models with sufficiently simple 3D surfaces, however, to enable drawing on more complex 3D surfaces, such as non-convex surfaces, for example, a more robust raycast strategy may be required because performance of a raycast on non-convex surfaces may result in multiple raycast hits from a single target object. Additionally, due to changes in head-tracking location or target model reorientation, a newly emerging surface of the target 3D model may obstruct visibility of the previously found TSP, the basic raycast strategy may lead to an undesirable discontinuity in stroke path.

Thus, in certain embodiments, an enhanced TSP raycast may be performed for iterations. In such embodiments, the raycast query may collect all hits (i.e., intersections or collisions between query ray 600 and a surface of the target 3D model) found for the target 3D model during the iteration and compare the hits found with the TSP of the previous iteration. In certain embodiments, meta data about the target surface may also be used in the comparison. Then, based on the results of the comparison, the most appropriate hit, rather than the first hit, may be chosen for the new TSP. In certain embodiments the optimal appropriateness may be found by maximizing spatial continuity or meta data continuity (e.g. material, layer, etc).

FIG. 6B illustrates a translation of the target 3D model according to embodiments. Note that if a TSP is not located during initialization or continuation of the raycast, then the initialization step or continuation of the raycast will be repeated until a TSP may be identified. As shown, if TSP 614 is identified, target 3D model 604 (or the software system rendering of the object may be such that the object may be shifted with regard to the frustum such that the TSP 614 becomes the render plane and the object may be reoriented so the TSP 614 associated with the object from which the TSP is a part is tangent to the frustum render plane) may be translated such that TSP 614 may be coincident with zero parallax plane 602. The translation may be performed by first projecting TSP 614 onto zero parallax plane 602 such that projected TSP 616 may be collinear with query ray 600 used to generate TSP 614 and then by calculating a delta vector between TSP 614 and projected TSP 616. This delta vector may then be applied as a translation shift along translation vector 618 to reposition target 3D model 604 as shown. Note that in certain embodiments, one or more 3D stereoscopic rendering variables, such as world scale and stereo level, among others, may be adjusted accordingly to maintain optimum viewer comfort. Note that in certain embodiments, the instead of the object being shifted with regard to the frustum (i.e., camera POV used to render and display the 3D scene), the entire frustum may be shifted to translate the object to be coincident with the zero parallax plane 602. In other words, the entire scene may be transformed along the query ray via establishment of a rendering, or camera, POV.

FIG. 6C illustrates a rotation of the target 3D model according to embodiments. As shown, target 3D model 604 may be rotated or reoriented so as to ensure the normal vector at projected TSP 616 is aligned with the normal vector of zero parallax plane 602. In other words, target 3D model 604 may be reoriented such that the surface tangent plane at projected TSP 616 may be parallel to zero parallax frustum render plane 602, which, when rendered, correlates to the user viewing the object TSP at the display surface. In certain embodiments, a TPS normal vector of target 3D model 604 may be determined at projected TSP 616. In certain embodiments, the normal vector may be determined via per-vertex normal blending or automatically calculated triangle normals. The projected TSP normal vector may then be compared to the normal vector of zero parallax plane 602 to determine an orientation error (i.e. a difference in degrees about an axis) between the normal vectors. The orientation error may then be negated to form a corrective rotation that may be applied to the orientation of the target model (or the orientation of the frustum or virtual camera) about projected TSP 616 resulting in target 3D model 604's projected TSP normal being in alignment with the normal vector of zero parallax plane 602. Note that in certain embodiments, one or more 3D stereoscopic rendering variables, such as world scale and stereo level, among others, may be adjusted accordingly to maintain optimum viewer comfort.

FIG. 7 illustrates an example stroke according to embodiments. The stroke is presented as a sequence of user control element endpoint positions over time starting at diagram I and continuing through diagram v due to a drawing motion, or stoke, by the user. As illustrated, a user may be comfortably able to paint across the entire curvature of the target 3D model 604 without having to manually move the object to be drawn upon or draw in free space (i.e. off the display surface). Thus, starting from user control element endpoint position 712, the user may move the endpoint along zero parallax frustum render plane 602 and the system software will control the re-rendering of the target object such that the target 3D model 604 may be reoriented to track the users movements of the endpoint of the user control element using the techniques described above in reference to FIGS. 6A-C.

Note that in certain embodiments, translations and/or changes in orientation of a target 3D model may be visually jarring or create a visual discontinuity if applied instantaneously. Thus, in such embodiments, a temporal smoothing function may be applied to the translation and/or change in translation of the target 3D model in order to create visual continuity that may lead to a more pleasant user experience when drawing using ZPSA process. Note that in one embodiment the temporal smoothing function may be a low-pass filter.

In further embodiments, the system may have a tilt mode based on the user control element's tilt angle relative to the zero parallax plane. Thus, when the tilt mode is enabled, the user control element's tilting may affect how the target 3D model may come to zero parallax. Thus in certain embodiments, the tilt angle of the user control element may determine the movement and speed of the target 3D model if the user control element is otherwise stationary and, if the user control element is in motion, the rotation of the target 3D model. In further embodiments, it should be noted that the object surfaces may be continuous or discontinuous and the objects may be distinct from each other. Therefore, as the user control element is moved across the display surface, the object surface to be shifted to the zero parallax may be from the same object or may be changed to a second object.

FIGS. 8A-8D: Illustration of Exemplary Stroke Capture

FIGS. 8A-8D are illustrations of results from an exemplary stroke capture. As shown, a tip of a user control element, such as user control element 802 (shown as a stylus), may be placed on the screen of a 3D stereoscopic display system, such as system 806. System 806 may display a 3D scene and a user, via zero parallax drawing software such as described above, may select a target 3D model, such as 3D model 804. As shown in the progression from FIGS. 8A to 8D, the user may progressively move the stylus along the screen of system 806. This movement, or stroke, may be tracked by system 806 as described above. In response to the movement of stylus 802, stroke response software included in system 806 may use TSP locations as a user control element to modify 2D texture data, or to deform 3D surface data, and immediately, e.g., in real-time, present these modifications as changes to the appearance of the target 3D model, reflecting the results of the actions the user took while using zero parallax drawing. Stated another way, as the drawing motion occurs with the user control element, the system may respond by shifting or rotating the corresponding object such that its draw position may be readjusted to be at the zero parallax plane. Thus, the positioning of the target 3D object may be a function of the tracked user control element position, the tracked head position, and/or the position and orientation of the display. Note that in certain embodiments the entire scene may shift or rotate to accommodate the drawing while in other embodiments only the target 3D object of interest may shift or rotate to accommodate the drawing.

Alternatively, as a tip of a user control element is moved along the screen and the target 3D model's shape is such that an out of plane (e.g., along the Z-axis of the system) change in position may be necessary, the system may temporarily shift the object along the Z-axis of the display device (and hence the frustum and frustum render plane) and/or rotate the object in a manner to bring the appropriate TSP to the zero parallax location.

In another embodiment, given the head position and orientation of the user and the user control element position and orientation, where the user control element may be positioned on the surface of a stereoscopic 3D display screen, the object to be drawn or drawn upon may be temporarily placed such that the area to be drawn may be at zero parallax in a manner that the object spot in X-Y proximity of the stylus is at the zero parallax position.

Figure 9:
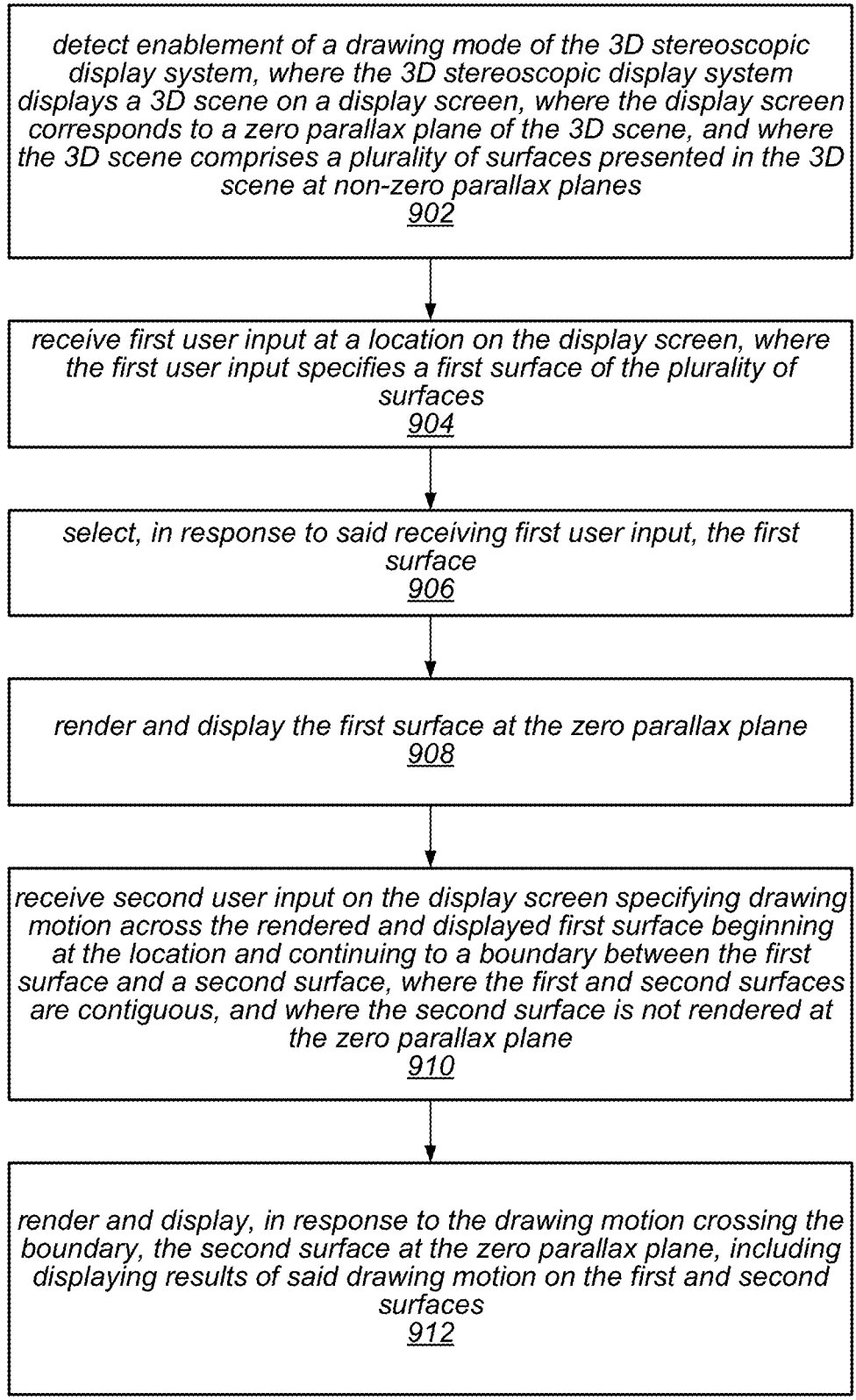
FIG. 9 is a block diagram of an exemplary method for zero parallax drawing according to embodiments.

FIG. 9: Block Diagram of a Method for Digitally Drawing on 3D Objects

FIG. 9 illustrates an exemplary embodiment of a method for digitally drawing on virtual three dimensional (3D) object surfaces using a 3D stereoscopic display system. The method shown in FIG. 9 may be used in conjunction with any of the computer systems, devices, or software shown in, or described in reference to, the above Figures, among other systems, devices, and software. In various embodiments, some of the method elements shown may be performed concurrently, in a different order than shown, or may be omitted. Additional method elements may also be performed as desired. As shown, this method may operate as follows.

In 902, a drawing mode of the 3D stereoscopic display system may be enabled. In certain embodiments the drawing mode may be a zero parallax drawing mode. Additionally, in some embodiments, the drawing mode may be enabled by a screen touch-begin or a screen tap-begin event as described above with reference to FIG. 5. In an exemplary embodiment, the 3D stereoscopic display system may display a 3D scene on a display screen and the display screen may correspond to a zero parallax plane of the 3D scene. The 3D scene may include surfaces, e.g., a plurality of surfaces, presented in the 3D scene at non-zero parallax planes.

In 904, user input at a location on the display screen may be received as first user input. The first user input may specify a first surface of the plurality of surfaces presented in the 3D scene at non-zero parallax planes. Note that in certain embodiments the user input may be received via a user control element such as a stylus. Additionally, in some embodiments, the point of view (POV) of the user may be tracked by a head tracking system described in reference to FIG. 4. Similarly, the position and orientation of the user control element may be tracked by a user control element tracking system described in reference to FIG. 4.

In 906, in response to receiving the first user input, the specified first surface may be selected. Note that, in certain embodiments, the raycast query process described above in reference to FIG. 6A may be used to specify and select the first surface. Thus, in one such embodiment where the first user input may be received via a user control element having a corresponding position, selecting the first surface may include determining an intersection between a query ray and the first surface. The query ray may intersect the zero parallax plane at the corresponding position of the user control element, i.e., where the user control element touches the display screen, and may have a direction specified by one of a corresponding orientation of the user control element, a corresponding orientation of the user's point of view (POV) relative to the corresponding position of the user control element, an orientation of a defined virtual POV relative to the corresponding position of the user control element, or a default orientation based on one or more of the type of 3D object surface to be drawn upon (e.g., the first surface), a mode of the 3D stereoscopic display system, or to the correspondence to the dual surface renderings of the stereo displayed model surfaces as per each user's eye POV.

In 908, based on the user POV and display screen position/orientation to the user perspective, may be appropriately projected and rendered and displayed at the zero parallax plane on the display screen. In one embodiment, a first rendering may be displayed where the first surface is rendered at the zero parallax plane. Note that, in certain embodiments, the raycast query process described above in reference to FIGS. 6B and 6C may be used to translate and or rotate the first surface to the zero parallax plane. Thus, one such embodiment where the first user input may be received via a user control element having a corresponding position and a query ray may be used to select the first surface, the method may further include translating the first surface from a non-zero parallax plane to the zero parallax plane along the query ray such that the intersection between the query ray and the first surface is coincident to the corresponding position of the user control element. Similarly, in certain embodiments where the first user input may be received via a user control element having a corresponding position and a query ray may be used to select the first surface, the method may further include rotating the first surface from a non-zero parallax plane to the zero parallax plane such that a normal vector at the intersection between the query ray and the first surface is parallel to a normal vector of the zero parallax plane. Additionally, in certain embodiments, the method may further include transforming the first surface from a non-zero parallax plane to the zero parallax plane. It should be noted that the query ray may be a hybrid query ray based on the user's view for each eye and hence, each rendering, of the user's POV. The transforming may include one or more of a translation or rotation as described above. Further in certain embodiments, a temporal smoothing function, such as a low pass filter, may be applied to either the rotation or translation described.

Note that in some embodiments, the 3D scene may include surfaces presented in the 3D scene at non-zero parallax planes with respect to a camera POV. In other words, the 3D scene may have a rendering frustum that may correspond to a POV of a virtual camera. In such embodiments, rendering and displaying the first surface may include transforming the camera POV to render and display the first surface at the zero parallax plane. In other words, instead of the first surface moving within the 3D scene, the entire 3D scene may be moved (or more generally, transformed) such that the first surface coincides with the zero parallax plane. The entire 3D scene may be transformed via a change, or relocation, to the camera POV, or frustum, used to the render and display the 3D scene.

In 910, second user input on the display screen specifying drawing motion across the rendered and displayed first surface may be received. The drawing motion may begin at the location of the first user input and may continue to a boundary between the first surface and a second surface. In certain embodiments, the first and second surfaces may be contiguous and the second surface may not be rendered at the zero parallax plane.

In 912, the second surface, in response to the drawing motion crossing the boundary, may be rendered and displayed at the zero parallax plane. In one embodiment, a second rendering may be displayed where the second surface is rendered at the zero parallax plane and the first surface is rendered at a non-zero parallax plane. Additionally, results of the drawing motion on the first and second surfaces may be rendered and displayed. In certain embodiments, rendering and displaying the second surface may include rendering and displaying the first surface at a non-zero parallax plane.

In further embodiments, one or more additional user inputs on the display screen specifying a corresponding one or more additional drawing motions may be received. Note that each of the one or more additional drawing motions may continue to a respective boundary between a respective pair of contiguous surfaces of the plurality of surfaces. Accordingly, a first additional drawing motion of the one or more drawing motions may continue to a boundary between the second surface and a third surface that is contiguous with the second surface. In such embodiments, in response to the first additional drawing motion, the third surface may be rendered and displayed at the zero parallax and the first and second surfaces may be rendered and displayed with results of the drawing motion and the first additional drawing motion. Note that this process may continue in an iterative manner with respect to additional surfaces until a user disables the 3D drawing mode.

It should be noted that the above-described embodiments are exemplary only, and are not intended to limit the invention to any particular form, function, or appearance. Moreover, in further embodiments, any of the above features may be used in any combinations desired. In other words, any features disclosed above with respect to one method or system may be incorporated or implemented in embodiments of any of the other methods or systems.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer readable memory medium storing programming instructions for drawing on virtual three dimensional (3D) object surfaces of a 3D scene via a 3D stereoscopic display system, wherein the 3D scene comprises a plurality of surfaces presented at non-zero parallax planes, and wherein the programming instructions are executable by a processor to:
   display a first rendering of the 3D scene via a display screen of the 3D stereoscopic display system, wherein the display screen corresponds to a zero parallax plane of the rendered 3D scene;
   display a second rendering responsive to receiving first user input on the display screen that selects a first surface of the plurality of surfaces, wherein the first surface is presented at a first non-zero parallax plane in the first rendering, and wherein the first surface is rendered at the zero parallax plane in the second rendering; and
   display a third rendering responsive to receiving second user input on the display screen that specifies a painting motion across the second rendering of the first surface beginning at a location of the first surface and continuing across a boundary between the first surface and a second surface, wherein the second surface is not rendered at the zero parallax plane in the second rendering, and wherein the second surface is rendered at the zero parallax plane and the first surface is rendered at a non-zero parallax plane in the third rendering, including rendering and displaying results of said painting motion on the first and second surfaces.

2. The non-transitory computer readable memory medium of claim 1, wherein the program instructions are further executable by the processor to:
   receive one or more additional user inputs on the display screen specifying a corresponding one or more additional painting motions, wherein each of the one or more additional painting motions continues to a respective boundary between a respective pair of contiguous surfaces of the plurality of surfaces, and wherein a first additional painting motion of the one or more painting motions continues to a boundary between the second surface and a third surface, wherein the third surface is presented at a second non-zero parallax plane; and
   display a fourth rendering in response to the first additional painting motion crossing the boundary between the second and third surfaces, wherein the third surface is rendered at the zero parallax plane and the first and second surfaces are rendered at a third non-zero parallax plane, including rendering and displaying results of said painting motion on the first and second surfaces and rendering and displaying results of said first additional painting motion on the second and third surfaces.

3. The non-transitory computer readable memory medium of claim 1,
   wherein the first and second surfaces are contiguous.

4. The non-transitory computer readable memory medium of claim 1,
   wherein, to display the second rendering, the program instructions are further executable to transform the first surface from the first non-zero parallax plane to the zero parallax plane, wherein said transforming comprises one or more of a translation or a rotation.

5. The non-transitory computer readable memory medium of claim 1, wherein the 3D scene comprises a plurality of surfaces presented in the 3D scene at non-zero parallax planes with respect to a camera POV, and wherein to display the second rendering, the program instructions are further executable to:
   transform the camera POV to render and display the first surface at the zero parallax plane.

6. The non-transitory computer readable memory medium of claim 1,
   wherein the first user input is received via a user control element, wherein the user control element has a corresponding position, and wherein to select the first surface, the program instructions are further executable to:
      determine an intersection between a query ray and the first surface, wherein the query ray intersects the zero parallax plane at the corresponding position of the user control element, and wherein the query ray has a direction specified by one of:
         a corresponding orientation of the user control element;
         a corresponding orientation of the user's point of view (POV) relative to the corresponding position of the user control element;
         an orientation of a defined virtual POV relative to the corresponding position of the user control element; or
         a default orientation based on one or more of:
            a type of the first surface; or
            a mode of the 3D stereoscopic display system.

7. The non-transitory computer readable memory medium of claim 6,
   wherein to display the second rendering, the program instructions are further executable to:
      translate the first surface from the first non-zero parallax plane to the zero parallax plane along the query ray such that the intersection between the query ray and the first surface is coincident to the corresponding position of the user control element.

8. The non-transitory computer readable memory medium of claim 6,
   wherein to display the first rendering, the program instructions are further executable to:
      rotate the first surface from the first non-zero parallax plane to the zero parallax plane such that a normal vector at the intersection between the query ray and the first surface is parallel to a normal vector of the zero parallax plane.

9. A three dimensional (3D) stereoscopic display system, comprising:
   a display screen, and
   a functional unit coupled to the display screen, wherein the functional unit is configured to:
      display a first rendering of a 3D scene via the display screen, wherein the display screen corresponds to a zero parallax plane of the rendered 3D scene, wherein the 3D scene comprises a plurality of surfaces presented at non-zero parallax planes;

display a second rendering responsive to receiving first user input on the display screen that selects a first surface of the plurality of surfaces, wherein the first surface is presented at a first non-zero parallax plane in the first rendering, and wherein the first surface is rendered at the zero parallax plane in the second rendering; and display a third rendering responsive to receiving second user input on the display screen that specifies a painting motion across the second rendering of the first surface beginning at a location of the first surface and continuing across a boundary between the first surface and a second surface, wherein the second surface is not rendered at the zero parallax plane in the second rendering, and wherein the second surface is rendered at the zero parallax plane and the first surface is rendered at a non-zero parallax plane in the third rendering, including rendering and displaying results of said painting motion on the first and second surfaces.

10. The 3D stereoscopic display system of claim 9, wherein the functional unit is further configured to:
receive one or more additional user inputs on the display screen specifying a corresponding one or more additional painting motions, wherein each of the one or more additional painting motions continues to a respective boundary between a respective pair of contiguous surfaces of the plurality of surfaces, and wherein a first additional painting motion of the one or more painting motions continues to a boundary between the second surface and a third surface, wherein the third surface is presented at a second non-zero parallax plane; and
display a fourth rendering in response to the first additional painting motion crossing the boundary between the second and third surfaces, wherein the third surface is rendered at the zero parallax plane and the first and second surfaces are rendered at a third non-zero parallax plane, including rendering and displaying results of said painting motion on the first and second surfaces and rendering and displaying results of said first additional painting motion on the second and third surfaces.

11. The 3D stereoscopic display system of claim 9, wherein the first and second surfaces are contiguous.

12. The 3D stereoscopic display system of claim 9, wherein, to display the second rendering, the functional unit is further configured to transform the first surface from the first non-zero parallax plane to the zero parallax plane, wherein said transforming comprises one or more of a translation or a rotation.

13. The 3D stereoscopic display system of claim 9, wherein the 3D scene comprises a plurality of surfaces presented in the 3D scene at non-zero parallax planes with respect to a camera POV, and wherein to display the second rendering, the functional unit is further configured to:
transform the camera POV to render and display the first surface at the zero parallax plane.

14. The 3D stereoscopic display system of claim 9, wherein the first user input is received via a user control element, wherein the user control element has a corresponding position, and wherein to select the first surface, the functional unit is further configured to:
determine an intersection between a query ray and the first surface, wherein the query ray intersects the zero parallax plane at the corresponding position of the user control element, and wherein the query ray has a direction specified by one of:
    a corresponding orientation of the user control element;
    a corresponding orientation of the user's point of view (POV) relative to the corresponding position of the user control element;
    an orientation of a defined virtual POV relative to the corresponding position of the user control element; or
    a default orientation based on one or more of:
        a type of the first surface; or
        a mode of the 3D stereoscopic display system.

15. The 3D stereoscopic display system of claim 14, wherein to display the second rendering, the functional unit is further configured to:
translate the first surface from the first non-zero parallax plane to the zero parallax plane along the query ray such that the intersection between the query ray and the first surface is coincident to the corresponding position of the user control element.

16. The 3D stereoscopic display system of claim 14, wherein to display the first rendering, the functional unit is further configured to:
rotate the first surface from the first non-zero parallax plane to the zero parallax plane such that a normal vector at the intersection between the query ray and the first surface is parallel to a normal vector of the zero parallax plane.

17. A method for digitally drawing on virtual three dimensional (3D) object surfaces using a 3D stereoscopic display system, comprising:
displaying a first rendering of a 3D scene via a display screen of the 3D stereoscopic display system, wherein the display screen corresponds to a zero parallax plane of the rendered 3D scene, wherein the 3D scene comprises a plurality of surfaces presented at non-zero parallax planes;
displaying a second rendering responsive to receiving first user input on the display screen that selects a first surface of the plurality of surfaces, wherein the first surface is presented at a first non-zero parallax plane in the first rendering, and wherein the first surface is rendered at the zero parallax plane in the second rendering; and
displaying a third rendering responsive to receiving second user input on the display screen that specifies a painting motion across the second rendering of the first surface beginning at a location of the first surface and continuing across a boundary between the first surface and a second surface, wherein the second surface is not rendered at the zero parallax plane in the second rendering, and wherein the second surface is rendered at the zero parallax plane and the first surface is rendered at a non-zero parallax plane in the third rendering, including rendering and displaying results of said painting motion on the first and second surfaces.

18. The method of claim 17, further comprising:
receiving one or more additional user inputs on the display screen specifying a corresponding one or more additional painting motions, wherein each of the one or more additional painting motions continues to a respective boundary between a respective pair of contiguous surfaces of the plurality of surfaces, and wherein a first additional painting motion of the one or more painting motions continues to a boundary between the second surface and a third surface, wherein the third surface is presented at a second non-zero parallax plane; and displaying a fourth rendering in response to the first additional painting motion crossing the boundary between the second and third surfaces, wherein the third surface is rendered at the zero parallax plane and the first and second surfaces are rendered at a third non-zero parallax plane, including rendering and displaying results of said painting motion on the first and second surfaces and rendering and displaying results of said first additional painting motion on the second and third surfaces.

19. The method of claim 17,
wherein the first and second surfaces are contiguous.

20. The method of claim 17,
wherein said displaying the second rendering further comprises transforming the first surface from the first non-zero parallax plane to the zero parallax plane, wherein said transforming comprises one or more of a translation or a rotation.

\* \* \* \* \*